Aug. 10, 1926.
H. VOLIS
1,595,368
INTERNAL MICROMETER
Filed March 30, 1925    2 Sheets-Sheet 1
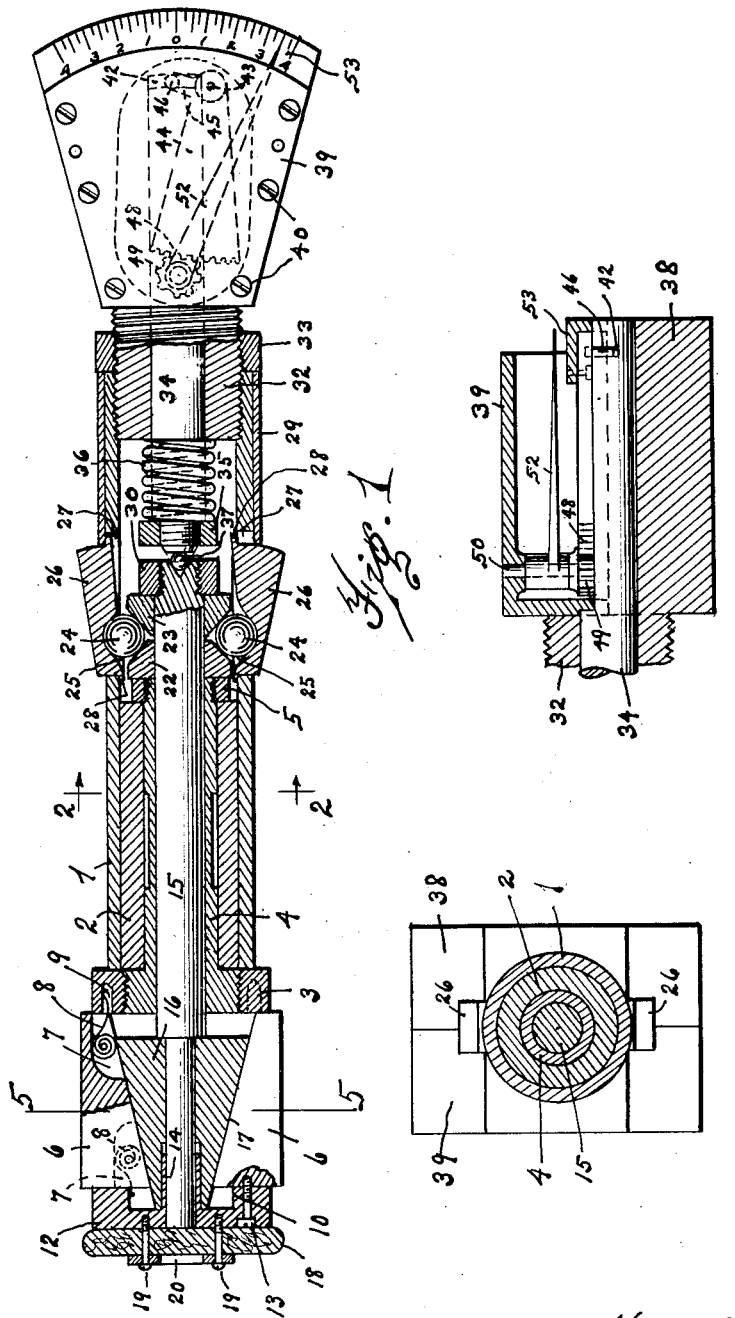
INVENTOR.
Harry Volis
BY
Edward N. Paguluw
ATTORNEY.

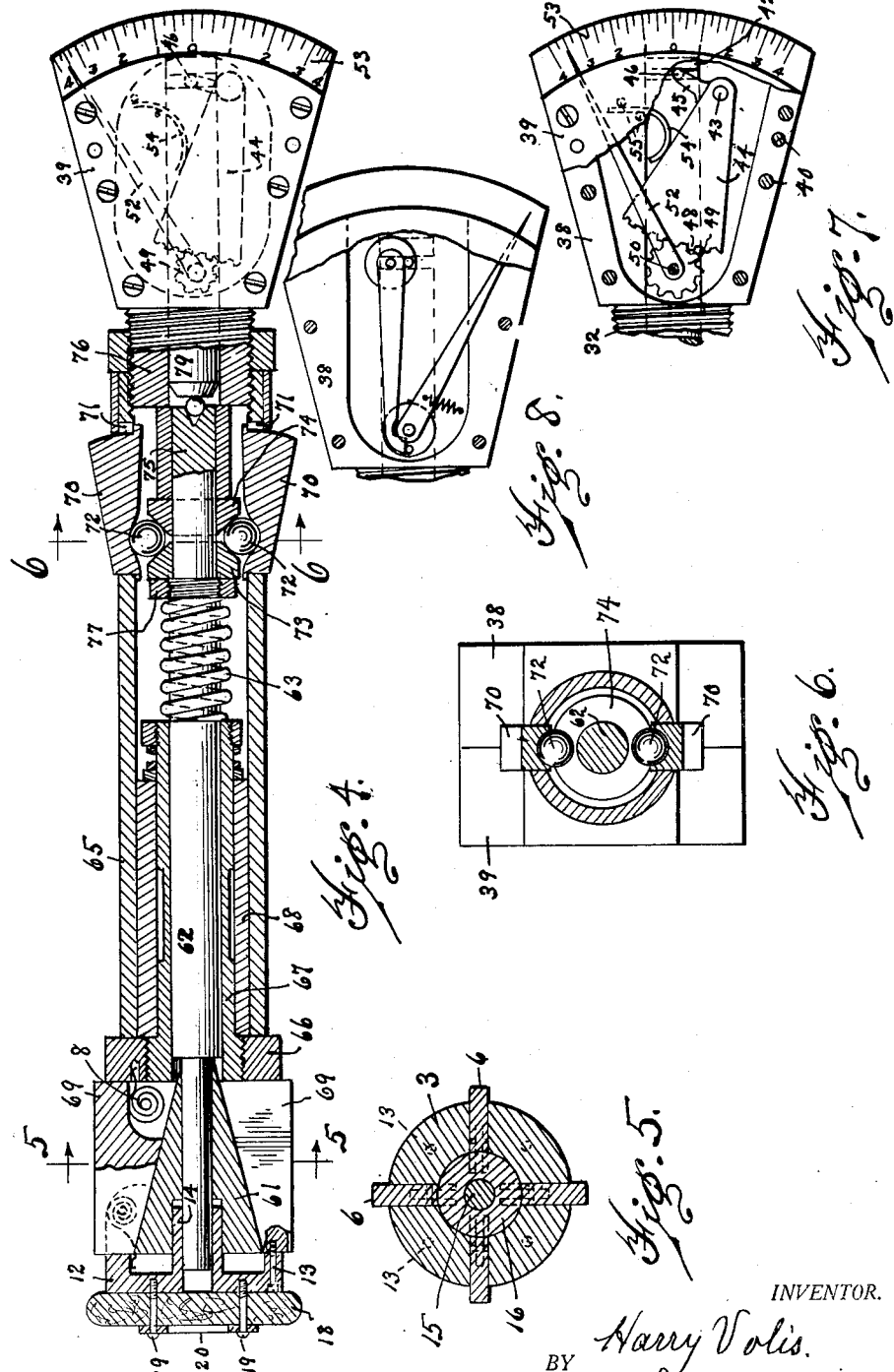

Patented Aug. 10, 1926.

1,595,368

UNITED STATES PATENT OFFICE.

HARRY VOLIS, OF DETROIT, MICHIGAN, ASSIGNOR TO VOLIS PRECISION TOOL COMPANY, OF DETROIT, MICHIGAN, A CORPORATION OF MICHIGAN.

INTERNAL MICROMETER.

Application filed March 30, 1925. Serial No. 19,389.

This invention relates to means for accurately measuring the diameters of holes, in machine parts and its object is to provide an instrument of this character which can be used to measure such diameters of holes in rotating objects, such as pieces of work in a lathe or grinding machine.

A further object of this invention is to produce an instrument of this character which is provided with engaging plates manually movable inwardly so that the instrument may be freely inserted into the hole to be measured and as freely withdrawn.

Another object of this invention is to provide an instrument of this character with a registering device to indicate the difference between the diameter of the hole being measured and that of the test or master gauge.

In the accompanying drawing Fig. 1 is a longitudinal section of a micrometer embodying my present invention. Fig. 2 is a section on the line 2—2 of Fig. 1. Fig. 3 is a longitudinal section of the indicator. Fig. 4 is a longitudinal section of a modified form of micrometer embodying the present invention. Fig. 5 is a section on the line 5—5 of Figs. 1 and 4. Fig. 6 is a section on the line 6—6 of Fig. 4. Fig. 7 is a plan of the indicator with a portion of the cover plate broken away. Fig. 8 is a similar view of a modified type of indicator.

Similar reference characters refer to like parts throughout the several views.

Referring first to Figs. 1, 2 and 3, this instrument comprises a cylindrical body 1 having a bearing sleeve 2 securely fitted in its outer end. A cylindrical head 3 screws onto the hollow shank 4 which is rotatable in the sleeve 2 and is prevented from moving endwise therein by the nut 5. The head 3 has four evenly spaced radial slots to receive the blades 6 (Fig. 5) which are flat plates formed with notches 7 in their inner inclined edges to receive the springs 8 which engage in a circumferential groove 9 in the head 3 and under a circumferential shoulder 10 on the cap 12. This cap is secure to the body by means of screws 13 and may have hub 14 to receive the shaft 15.

On this shaft is secured a cone 16 which engages the inclined inner edges 17 of the blades 6. When the cone is moved longitudinally inward, the blades move radially outward, and when the cone moves longitudinally outward, the springs 8 press the blades radially inward, so that the blades will always move with the shaft. As the shank 4 is rotatable within the body 1, the blades may engage the wall of the hole being measured and rotate therewith so that the usual time for stopping and starting the work is saved. As the whole is liable to contain chips or dust, I prefer to attach a disk 18 of felt or similar material to the cap 12 by means of screws 19 and a washer 20 so that when this instrument is inserted, this disk 18 will clean the hole ready for accurate measurement.

Two conical collars 22 and 23 are mounted on the shaft 15 and two balls 24 are positioned in the space between these washers and in the grooves 25 in the small levers 26 which are mounted in slots 27 in the body 1. These levers have ears 28 at their ends, those at one end extending beneath the body 1 at one end of the slots 27 and those at the other extending beneath the shell 29. When these levers are forced in, the balls separate the collars 22 and 23. The former rests on the nut 5 while the latter contacts with the nut 30 on the end of the shaft 15. As a result, the shaft will be pulled in when the levers are pressed inward. The shaft 15 may rotate within the collars or the collars may turn within the balls, so that very little friction is possible.

A plug 32 is screwed into the inner end of the body 1, being locked in position by the nut 33 which also positions the shell 29. A shaft 34 is slidable in this plug, being pressed toward the shaft 15 by the nut 35 and the spring 36. A ball 37 constitutes the bearing between these shafts. A base 38 is formed on this plug and a cap 39 is secured to the base by the screws 40. The shaft 34 is flattened and formed with a transverse groove 42. A stationary pivot 43 (Fig. 7) mounted on the base carries a lever 44 whose arm 45 carries a pin 46 slidable in the groove 42. The other arm of the lever has a segment 48 of gear teeth which mesh with the pinion 49 on the shaft 50 mounted in the cap 39. Secured to this pinion is an indicator pointer 52 which travels over the scale 53 formed on the base.

A spring 54, positioned between pins 55 (Fig. 7) and mounted in the cap keeps the parts in tension, presses the pin 46 against one wall of the groove 42 and prevents lost motion.

When this instrument is to be used, the levers 26 are pressed in manually and the head 3 with its blades 6 are inserted in a test ring which is accurately ground to size. The position of the pointer 52 is carefully noted, and it is too far from the 0 point, the nut 33 is loosed sufficiently to permit the plug 32 to be turned. Screwing the plug into the body 1 causes the pointer to swing from the position shown in Fig. 1 to that shown in Fig. 7. When the pointer is exactly at 0, the nut 33 is tightened to lock the parts in position. The blades may now be drawn in radially and the instrument lifted out of the test gauge.

It may be inserted now in the holes to be measured and the pointer 52 will indicate how much they are larger or smaller than the standard gauge. As the blades can be moved inwardly by merely pressing in the levers 26, there is a minimum amount of wear on these blades. When the blades become worn, the instrument can be quickly adjusted as above described. The spring 36 always forces the blades to completely span the hole being measured and at the same time moves the shaft 34 and its groove 42 so that the spring 54 may swing the pointer 52.

The structure shown in Fig. 4 differs principally from that of Fig. 1 in that the cone 61 on the shaft 62 is pulled in by the spring 63 instead of being pushed out, to expand the blades 64. The body 65 is similar to the body 1, the head 66 and its shank 67 which is rotatable in the bushing 68, and the cap 12 are of substantially the same construction as before described, the body again being formed with radial slots to receive the blades 69 which are held against the cone 61 by means of springs 8.

The small levers 70 are again mounted in slots 71 in the body 65 and are adapted to force the balls 72 toward each other against the inclined sides of the collars 73 and 74. The collar 74 abuts against the sleeve 75, which, in turn, engages the plug 76 which screws into the body 68. As a result, the shaft 62 will be moved to the left in Fig. 4 whenever these levers 70 are forced inward, for the collar 73 and nut 77 will be moved longitudinally of the body 65 against the spring 63, and carry the shaft 62 with them.

The shaft 79 is slidable in the body 38 attached to the plug 76 and is moved by the spring 54 in one direction and by the spring 63 in the other direction so that the pointer 52 will again indicate the variations in the diameters of the holes being measured.

The details of construction and the proportions of the parts of this instrument may all be changed by those skilled in the art without departing from the spirit of my invention as set forth in the following claims.

I claim:—

1. In a gauge, the combination of a body and a shaft slidable therein, an indicator base at one end of the body and a threaded member adjustably connecting it to the body, an indicating hand mounted on the base, a head at the other end of the body, radially slidable blades mounted in said head, means to cause the blades to move radially as the shaft moves longitudinally, means to cause the indicator hand to move with the shaft, and means to lock the indicator base to the body after being adjusted to bring the indicating hand to initial position.

2. In a gauge, the combination of a body and a shaft slidable therein, an indicator base adjustably connected to one end of the body, a movable indicator mounted on the base, a head at the other end of the body, radially slidable blades mounted in said head, means to cause the blades to move radially as the shaft moves longitudinally, and means to cause the indicator to move with the shaft, a spring to move the shaft in one direction, and manually operable means to cause the shaft to move in the opposite direction against the tension of said spring, said indicator base being adjustable relative to the body to bring the indicator to initial position.

3. In a gauge, the combination of a body and a shaft slidable therein, an indicator at one end of the body, a head at the other end of the body, radially slidable blades mounted in said head, means to cause the blades to move radially as the shaft moves longitudinally, and means to cause the indicator to move with the shaft, a spring to move the shaft in one direction, and manually operable means to cause the shaft to move in the opposite direction against the tension of said spring comprising a pair of collars having opposed inclined sides, one of the collars being movable with the shaft and the other stationary in the body, a ball, and means to force the ball into the space between the collars to cause them to separate and thereby slide the shaft in the body.

4. In a gauge, a head having radial slots and shank, blades slidably mounted in said slots comprising flat tapering plates having straight contact edges, a shaft slidable longitudinally of said shank and a cone attached to the shaft and engaging said blades to slide them outward, means to press the blades inwardly, a spring to slide the shaft and cone in one direction to move the blades outwardly, and manually operable means to move the shaft and cone in the opposite direction to permit the blades to move inwardly the outer edges of said blades normally lying in the surface of an imaginary cylinder whose axis is that of said shaft.

5. In a gauge, a tubular body, a head having radial slots, a shank on the head rotatably mounted in the body, blades radially slidable in said slots, a shaft slidable longitudinally of said shank and a cone attached to the shaft and engaging said blades to slide them outward, means to move the blades inward, a spring to slide the shaft and cone in one direction to move the blades outwardly, and manually operable means to move the shaft and cone in the opposite direction to permit the blades to move inwardly.

6. In a gauge, a tubular body having a bearing sleeve, a head having radial slots, a shank on the head rotatably mounted in the bearing sleeve, blades radially slidable in the slots in the head, a shaft slidable longitudinally of said shank and a cone attached to said shaft and engaging said blades to move them outward, means to move the blades inward, a conical collar on the shaft, and manually operable means engaging the collar to force the shaft longitudinally against the spring.

HARRY VOLIS.